United States Patent
Park et al.

(10) Patent No.: US 9,502,173 B2
(45) Date of Patent: Nov. 22, 2016

(54) SHIELD PART, METHOD OF FABRICATING THE SAME, AND CONTACTLESS POWER TRANSMISSION DEVICE HAVING THE SHIELD PART

(71) Applicant: SAMSUNG ELECTRO-MECHANICS CO., LTD., Suwon, Gyunggi-do (KR)

(72) Inventors: Seung Wook Park, Gyunggi-do (KR); No Il Park, Gyunggi-do (KR); Doo Sung Jung, Gyunggi-do (KR); Jang Su Kim, Gyunggi-do (KR); Chang Bae Lee, Gyunggi-do (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 652 days.

(21) Appl. No.: 14/033,410

(22) Filed: Sep. 20, 2013

(65) Prior Publication Data

US 2015/0001951 A1     Jan. 1, 2015

(30) Foreign Application Priority Data

Jun. 28, 2013  (KR) .......................... 10-2013-0075758

(51) Int. Cl.
| | |
|---|---|
| H01F 38/14 | (2006.01) |
| H01F 27/28 | (2006.01) |
| H02J 7/02 | (2016.01) |
| H02J 5/00 | (2016.01) |

(52) U.S. Cl.
CPC .......... *H01F 38/14* (2013.01); *H01F 27/2804* (2013.01); *H01F 27/288* (2013.01); *H02J 50/70* (2016.02); *H01F 2027/2809* (2013.01); *H02J 5/005* (2013.01); *H02J 7/025* (2013.01); *Y10T 156/1057* (2015.01)

(58) Field of Classification Search
CPC .. H01F 38/14; H01F 27/2804; H01F 27/288; H02J 50/70
See application file for complete search history.

(56) References Cited

U.S. PATENT DOCUMENTS

| | | | |
|---|---|---|---|
| 2015/0123605 A1* | 5/2015 | Hyun | .................. H01F 27/2804 320/108 |
| 2015/0130582 A1* | 5/2015 | Hyun | ........................ H01F 1/22 336/200 |

FOREIGN PATENT DOCUMENTS

| | | | |
|---|---|---|---|
| JP | 2008205215 A | * | 9/2008 |
| KR | 10-2007-0113770 A | | 11/2007 |
| KR | 10-2013-0010797 A | | 1/2013 |

* cited by examiner

*Primary Examiner* — Daniel Cavallari
(74) *Attorney, Agent, or Firm* — NSIP Law

(57) ABSTRACT

There is provided a shield part including: a magnetic laminate formed by laminating a plurality of magnetic layers and having a first surface and a second surface; a coil pattern formed on the first surface; and a first lead part formed at an end portion of a central portion of the coil pattern and a second lead part formed outside of the coil pattern, wherein a portion of the second surface is removed to form a recess, the first lead part is electrically connected to the second lead part by a conductive material disposed in the recess and a first via formed in the magnetic laminate in a lamination direction, and the second lead part is electrically connected to the first lead part by the conductive material disposed in the recess and a second via formed in the magnetic laminate in the lamination direction.

9 Claims, 4 Drawing Sheets

SHIELD PART, METHOD OF FABRICATING THE SAME, AND CONTACTLESS POWER TRANSMISSION DEVICE HAVING THE SHIELD PART

CROSS-REFERENCE TO RELATED APPLICATIONS

This application claims the priority of Korean Patent Application No. 10-2013-0075758 filed on Jun. 28, 2013, in the Korean Intellectual Property Office, the disclosure of which is incorporated herein by reference.

BACKGROUND OF THE INVENTION

1. Field of the Invention

The present invention relates to a shield part, a method of fabricating the same, and a contactless power transmission device having the shield part.

2. Description of the Related Art

Research into a system for wirelessly, that is, contactlessly, transmitting electrical power in order to charge a secondary battery embedded in a portable terminal, or the like, has recently been conducted.

Generally, a contactless power transmission device includes a contactless power transmitter transmitting power and a contactless power receiver receiving and storing the power therein.

Such a contactless power transmission device transmits and receives electrical power using the principle of electromagnetic induction. To this end, an inner portion of each of the contactless power transmitter and the contactless power receiver is provided with a coil.

In the contactless power transmission device according to the related art, this coil is wound in parallel with a bottom surface (that is, an external contact surface). In addition, the coil is fixed to the bottom surface by an adhesive, an adhesive sheet, or the like.

However, in the case of the contactless power transmission device according to the related art, a coil having a general wire form is used, such that when the coil is wound, it may be wound in a form in which it is overlapped and stacked. Therefore, a thickness of the contactless power transmission device may be increased due to a thickness of the coil, the amount of turns of the coil, and the like.

Therefore, in accordance with the recent trend toward thin devices, there is a need to develop a contactless power transmission device having a reduced thickness.

To this end, a thin film coil formed in a thin film form rather than in a wire form is used, such that a thickness thereof may be significantly reduced, as compared to the coil having the wire form.

However, in the case of using the thin film coil, in order to lead the coil from a central portion of the thin film coil to the outside to thereby be electrically connected to the outside, a thickness of a portion crossing the coil is unavoidably increased.

Therefore, a thickness of the thickest portion of the coil is determined according to a thickness of a lead part of the coil.

That is, in order to allow the overall thickness of the contactless power transmission device to be reduced, a method of further reducing the thickness of the thickest portion of the coil as described above has been required.

A wireless electronic charging device characterized by a lead part of a coil is disclosed in the following Related Art Document (Patent Document 1).

However, since the coil disclosed in Patent Document 1 has a wire form, the coil is different from a thin film coil according to the present invention, and a thickness of the coil is relatively high.

In addition, since the coil disclosed in Patent Document 1 has the wire form, a portion of a shield sheet is removed, such that a lead part of the coil may be formed in the removed portion. However, since the coil according to the present invention is a thin film coil, there is a difference in that it is impossible to form a lead part such as that of Patent Document 1.

RELATED ART DOCUMENT (Patent Document 1) Korean Patent Laid-Open Publication No. 2013-0010797

SUMMARY OF THE INVENTION

An aspect of the present invention provides a shield part in which a lead part capable of electrically connecting an end portion of a central portion of a coil pattern to the outside is formed integrally with a magnetic laminate.

An aspect of the present invention also provides a contactless power transmission device capable of having high wireless charging efficiency and an increased communications distance in spite of having a thin thickness.

According to an aspect of the present invention, there is provided a shield part including: a magnetic laminate formed by laminating a plurality of magnetic layers and having a first surface and a second surface; a coil pattern formed on the first surface; and a first lead part formed at an end portion of a central portion of the coil pattern and a second lead part formed outside of the coil pattern, wherein a portion of the second surface is removed to form a recess, the first lead part is electrically connected to the second lead part by a conductive material disposed in the recess and a first via formed in the magnetic laminate in a lamination direction, and the second lead part is electrically connected to the first lead part by the conductive material disposed in the recess and a second via formed in the magnetic laminate in the lamination direction.

The second lead part may be connected to an external power supply.

The conductive material may further contain a magnetic material.

The shield part may further include a magnetic layer formed on a lower portion of the magnetic laminate.

The shield part may further include a conductive adhesive layer interposed between the first lead part and the first via; and a conductive adhesive layer interposed between the second lead part and the second via.

According to another aspect of the present invention, there is provided a method of fabricating a shield part, the method including: preparing a magnetic laminate having a first surface and a second surface by laminating a plurality of magnetic layers; preparing a recess by removing a portion of the second surface; preparing a first via connected to the recess by removing a portion of the first surface; preparing a second via connected to the recess by removing a portion of the first surface; filling the recess and the first and second vias with a conductive material; and forming a coil pattern on the first surface, wherein a first lead part is formed at an end portion of a central portion of the coil pattern and connected to the first via, and a second lead part is formed outside of the coil pattern and connected to the second via.

The method may further include: connecting the second lead part to an external power supply; and connecting an end portion formed at an outer edge of the coil pattern to the external power supply.

The forming of the coil pattern may be performed by sputtering or using a conductive paste.

The first via and the first lead part may be connected to each other using a conductive adhesive layer, and the second via and the second lead part may be connected to each other using a conductive adhesive layer.

The method may further include forming a magnetic layer on a lower portion of the magnetic laminate.

According to another aspect of the present invention, there is provided a contactless power transmission device including: a transmitter; and a receiver, wherein the transmitter includes a transmission shield part and an external power supply, and the receiver includes an electronic device, a power storage part, and reception shield part, the transmission or reception shield part including a magnetic laminate formed by laminating a plurality of magnetic layers and having a first surface and a second surface; a coil pattern formed on the first surface; and a first lead part formed at an end portion of a central portion of the coil pattern and a second lead part formed outside of the coil pattern, a recess being formed by removing a portion of the second surface, the first lead part being electrically connected to the second lead part by a conductive material disposed in the recess and a first via formed in the magnetic laminate in a lamination direction, and the second lead part being electrically connected to the first lead part by the conductive material disposed in the recess and a second via formed in the magnetic laminate in the lamination direction.

The magnetic laminate may have a thickness of 100 to 200 um.

The coil pattern may have a thickness of 5 to 95 um.

The transmission or reception shield part may have a thickness of 105 to 295 um.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
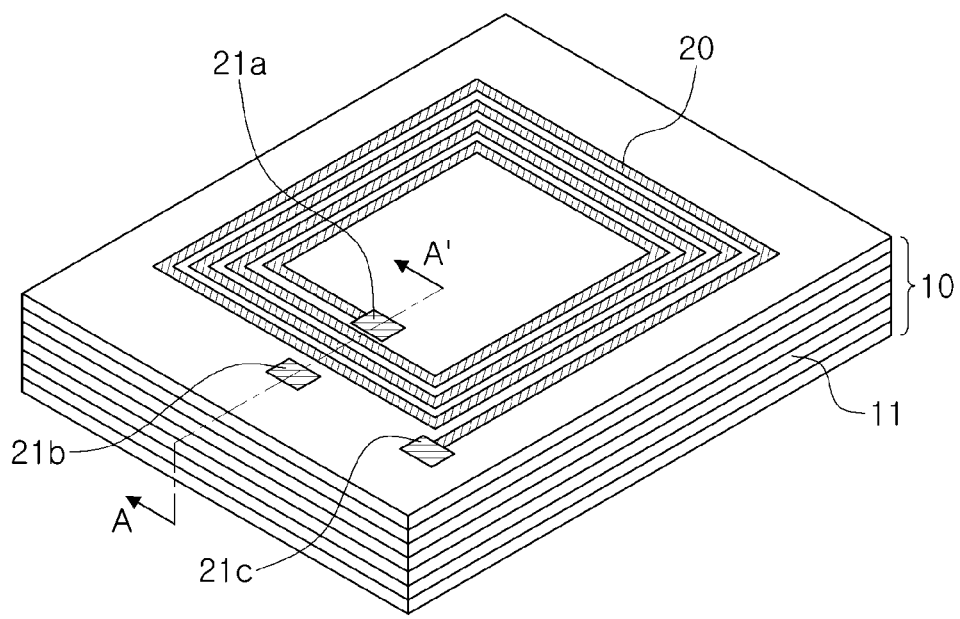
FIG. 1 is a schematic perspective view of a shield part according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Meanwhile, in describing the present embodiment, a contactless power transmission device generally includes a contactless power transmitter transmitting power and a contactless power receiver receiving and storing the power therein.

Further, although the present invention will be described based on the contactless power transmission device, the present invention may be used in near field communications (NFC), but the present invention is not limited thereto.

Figure 2:
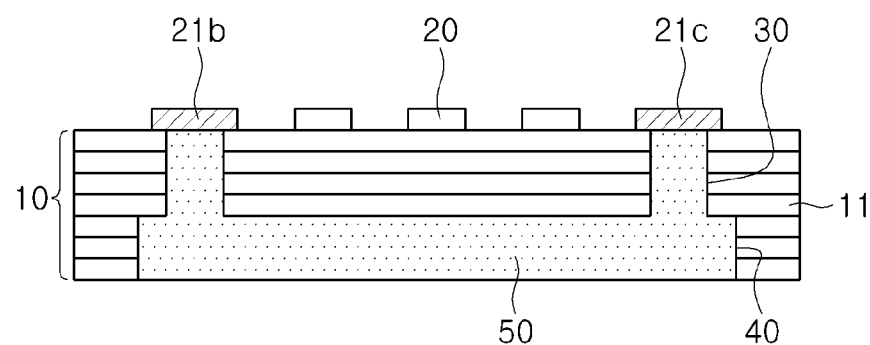
FIG. 2 is a schematic cross-sectional view taken along line A-A' of FIG. 1.

FIG. 1 is a schematic perspective view of a shield part according to an embodiment of the present invention, and FIG. 2 is a schematic cross-sectional view taken along line A-A' of FIG. 1.

A structure of a shield part according to the embodiment of the present invention will be described with reference to FIGS. 1 and 2. The shield part according to the embodiment of the present invention may include a magnetic laminate 10 and a coil pattern 20.

More specifically, the shield part according to the embodiment of the present invention may include the magnetic laminate 10 formed by laminating a plurality of magnetic layers 11 and having a first surface and a second surface; the coil pattern 20 formed on the first surface; and a first lead part 21a formed at an end portion of a central portion of the coil pattern 20 and a second lead part 21b formed outside of the coil pattern 20, wherein a portion of the second surface is removed to form a recess 40, the first lead part 21a is electrically connected to the second lead part 21b by a conductive material 50 disposed in the recess 40 and a first via 30a formed in the magnetic laminate 10 in a lamination direction, and the second lead part 21b is electrically connected to the first lead part 21a by the conductive material 50 disposed in the recess and a second via 30b formed in the magnetic laminate 10 in the lamination direction.

The magnetic laminate 10 may be formed by laminating the plurality of magnetic layers 11.

The coil pattern 20 may be formed on the magnetic laminate 10.

The magnetic layer 11 may be fabricated using a ferrite laminate, an amorphous metal, a laminate using a metal powder, or the like, but is not limited thereto.

The ferrite laminate may be made of at least one selected from a group consisting of NiZnCu, MnZn, and (M, Y, W, or Z)-type ferrite, but is not limited thereto.

The amorphous metal may be at least one selected from a group consisting of Ni-, Fe-, and Co-base metals, but is not limited thereto.

In the case of the laminate using the metal powder, a resin may be at least one selected from a group consisting of chlorinated polyethylene, polypropylene, ethylene propylene rubber, natural rubber, nitrile butadiene rubber, polyvinyl chloride, and polyimide based and polyester based resins, but is not limited thereto.

The magnetic laminate 10 may have the first surface and the second surface.

The recess 40 may be formed by removing the portion of the second surface.

In addition, a plurality of vias connected from the first surface to the recess 40 may be formed by removing portions of the first surface.

The plurality of vias may be the first via 30a connected to the first lead part 21a formed at the end portion of the central portion of the coil pattern 20 and the second via 30b connected to the second lead part formed outside of the coil pattern 20 instead of being directly connected to the coil pattern 20.

The recess 40 and the first and second vias 30a and 30b may be filled with the conductive material 50.

The conductive material 50 may be a material having excellent electric conductivity and formed using a metal powder or a polymer containing metal powder.

The conductive material 50 may further contain a magnetic powder in order to prevent leakage of magnetic flux generated in the coil.

The magnetic powder may be a ferrite-based powder, but is not limited thereto.

The first and second lead parts 21a and 21b may be electrically connected to each other by disposing the conductive material 50 in the recess 40 and the first and second vias 30a and 30b.

In order to apply current to the coil pattern 20 to generate an inductive magnetic field, both end portions of the coil pattern 20 need to be electrically connected to an external power supply.

In the case of a third lead part 21c formed at an end portion of an outer edge of the coil pattern 20, the third lead part 21c may be simply connected to the external power supply.

However, in the case of the first lead part 21a formed at the end portion of the central portion of the coil pattern 20, the first lead part 21a is unavoidably formed while crossing the coil pattern 20 in order to be electrically connected to the external power supply.

That is, according to the related art, since the first lead part 21a is electrically connected to the external power supply while crossing on the coil pattern 20 in order to connect the central portion of the coil pattern 20 to externally applied current, a portion at which the first lead part cross on the coil pattern becomes the thickest portion of the coil pattern.

In the shield part according to the embodiment of the present invention, since the first and second lead parts 21a and 21b may be electrically connected to each other by disposing the conductive material 50 in the recess 40 and the first and second vias 30a and 30b, a thickness of the coil pattern 20 may become thinner.

The coil pattern 20 may be formed as a thin film, and the thickness of the coil pattern 20 may be 5 to 95 um.

The coil pattern 20 may be formed as a spiral pattern.

The coil pattern 20 is formed as the spiral pattern, such that the end portion of the central portion of the coil pattern 20 may be provided with the first lead part 21a.

The coil pattern 20 may be formed using copper (Cu).

Figure 3:
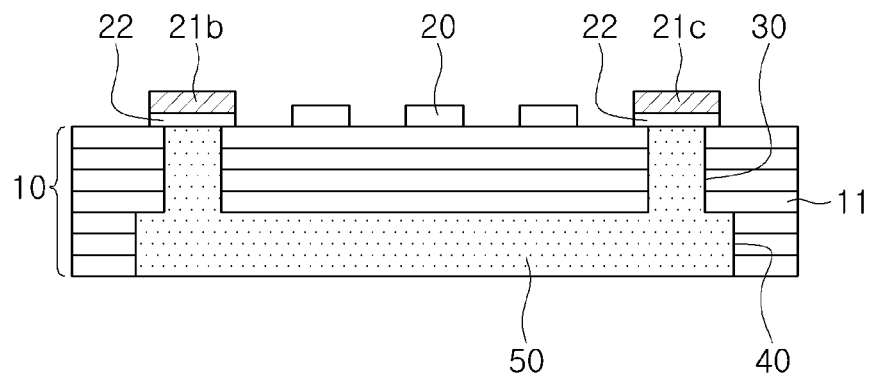
FIGS. 3 and 4 are schematic cross-sectional views showing a shield part according to another embodiment of the present invention.
Figure 4:
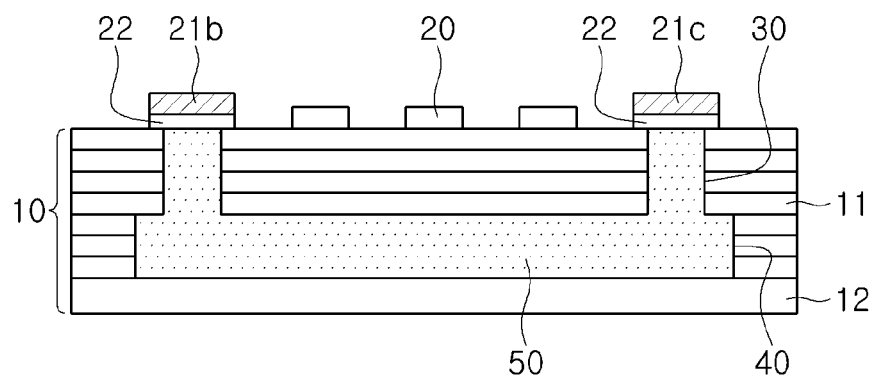

FIGS. 3 and 4 are schematic cross-sectional views showing a shield part according to another embodiment of the present invention.

Referring to FIG. 3, the shield part according to another embodiment of the present invention may further include a conductive adhesive layer 22 interposed between the first lead part 21a and the first via 30a; and a conductive adhesive layer 22 interposed between the second lead part 21b and the second via 30b.

The conductive adhesive layer 22 may be formed of at least one selected from a group consisting of an anisotropic conductive film, a conductive polymer, and a conductive metal, but is not limited thereto. That is, any conductive material may be used.

Preferably, the conductive adhesive layer 22 may be formed by soldering for convenience of a process and a competitive price.

Referring to FIG. 4, the shield part according to another embodiment of the present invention may further include a magnetic layer 12 formed on a lower portion of the magnetic laminate 10.

The shield part further includes a plurality of magnetic layers 12 on the lower portion of the magnetic laminate 10 to prevent leakage of magnetic flux generated when the current is applied to the coil, such that a communications distance and charging efficiency may be improved.

Figure 5:
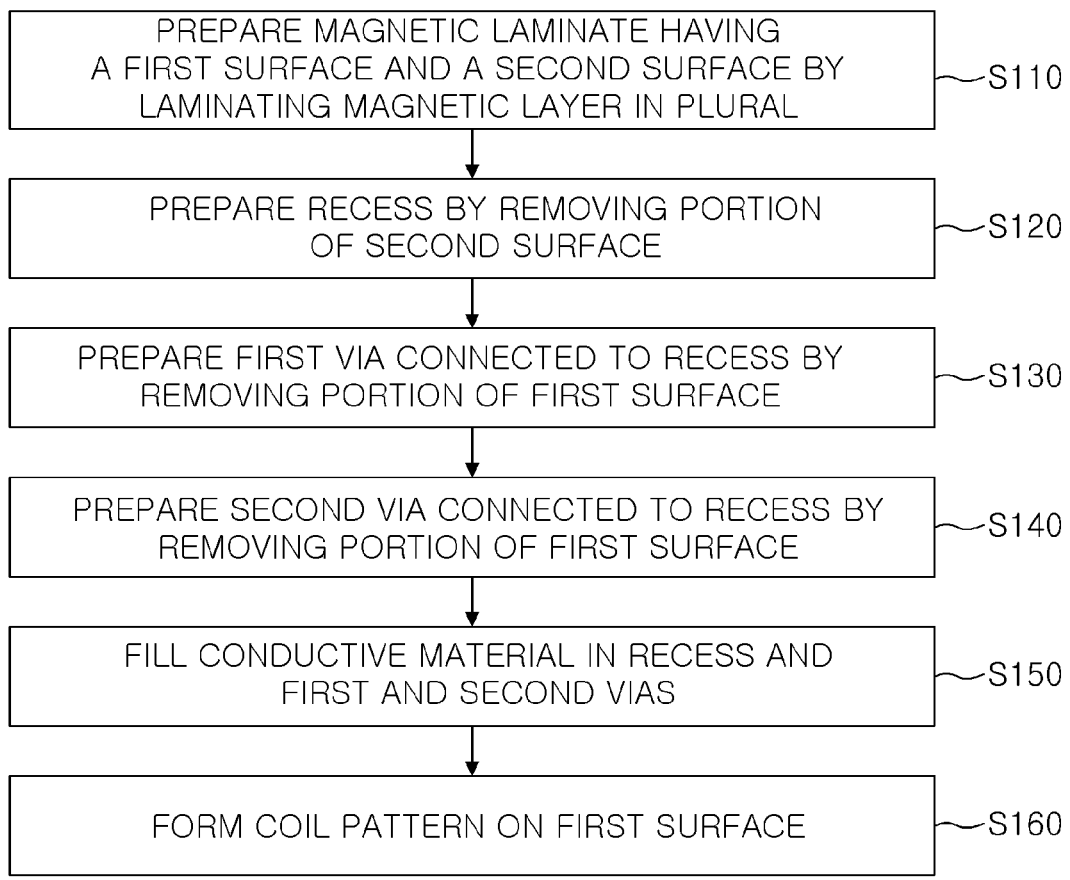
FIG. 5 is a flow chart showing a method of fabricating a shield part according to another embodiment of the present invention.

FIG. 5 is a flow chart showing a method of fabricating a shield part according to another embodiment of the present invention.

Referring to FIG. 5, the method of fabricating a shield part according to another embodiment of the present invention may include: preparing a magnetic laminate 10 having a first surface and a second surface by laminating a plurality of magnetic layers 11 (S110); preparing a recess 40 by removing a portion of the second surface (S120); preparing a first via 30a connected to the recess 40 by removing a portion of the first surface (S130); preparing a second via 3b connected to the recess 40 by removing a portion of the first surface (S140); disposing a conductive material 50 in the recess 40 and the first and second vias 30a and 30b (S150); and forming a coil pattern 20 on the first surface (S160), wherein a first lead part 21a is formed at an end portion of a central portion of the coil pattern 20 and connected to the first via 30a, and a second lead part 21b is formed outside of the coil pattern 20 and connected to the second via 30b.

First, the preparing of the magnetic laminate 10 may be performed by laminating and compressing the plurality of magnetic layers 11.

The magnetic laminate 10 may be fabricated using a ferrite laminate, an amorphous metal, a laminate using metal powder, or the like, but is not limited thereto.

A material of the ferrite laminate may be made of at least one selected from a group consisting of NiZnCu, MnZn, and (M, Y, W, or Z)-type ferrite, but is not limited thereto.

The amorphous metal may be at least one selected from a group consisting of Ni-, Fe-, and Co-base metals, but is not limited thereto.

In the case of the laminate using the metal powder, a resin may be at least one selected from a group consisting of chlorinated polyethylene, polypropylene, ethylene propylene rubber, natural rubber, nitrile butadiene rubber, polyvinyl chloride, and polyimide based and polyester based resins, but is not limited thereto.

Next, the preparing of the recess 40 (S120) may be performed.

The preparing of the recess 40 (S120) may be performed by removing the portion of the second surface of the magnetic laminate 10.

The preparing of the recess 40 (S120) may be performed using laser, etching, or the like.

In addition, the preparing of the recess 40 (S120) may be performed by forming a through hole corresponding to the recess 40 in a magnetic layer 11 positioned at a lower portion of the plurality of magnetic layers 11 forming the magnetic laminate 10 in advance in the preparing of the magnetic layer (S110).

That is, the recess 40 may be formed by laminating the plurality of magnetic layers 11 in which the through hole corresponding to the recess 40 is formed.

The preparing of the first via 30a connected to the recess 40 by removing the portion of the first surface (S130) and the preparing of the second via 30b connected to the recess 40 by removing the portion of the second surface (S140)

may be performed by a method similar to that in the preparing of the recess part (S120).

Thereafter, the disposing of the conductive material 50 in the recess 40, and the first and second vias 30a and 30b (S150) may be performed.

Before the disposing of the conductive material 50 (S150), preparing the conductive material 50 may be performed.

The preparing of the conductive material 50 may be performed together with a process of mixing magnetic powder with the conductive material.

Finally, the forming of the coil pattern 20 on the magnetic laminate 11 filled with the conductive material 50 (S160) may be performed.

The forming of the coil pattern 20 (S160) may be performed by sputtering or using a conductive paste.

In the forming of the coil pattern 20 (S160), when the end portion of the central portion of the coil pattern 20 is defined as the first lead part 21a, the first lead part 21a may be formed so as to contact the first via 30a.

The first via 30a and the first lead part 21a may be connected to each other using a conductive adhesive layer 22, and the second via 30b and the second lead part 21b may be connected to each other using the conductive adhesive layer 22.

The conductive adhesive layer 22 may be formed of at least one selected from a group consisting of an anisotropic conductive film, a conductive polymer, and a conductive metal, but is not limited thereto. That is, any conductive material may be used.

Preferably, the conductive adhesive layer 22 may be formed by soldering for convenience of a process and a competitive price.

That is, the first lead part 21a and the first via 30a are formed so as to contact each other, such that the end portion of the central portion of the coil pattern and the external power supply may be electrically connected to each other without crossing the coil pattern.

Particularly, in order to form current in the coil pattern 20, the second lead part 21b may be connected to the external power supply and a third lead part 21c formed at an end portion of an outer edge of the coil pattern 20 may be connected to the external power supply.

Further, in order to completely block leakage of magnetic flux, forming of a magnetic layer 12 on a lower portion of the magnetic laminate 10 may be further included.

Figure 6:
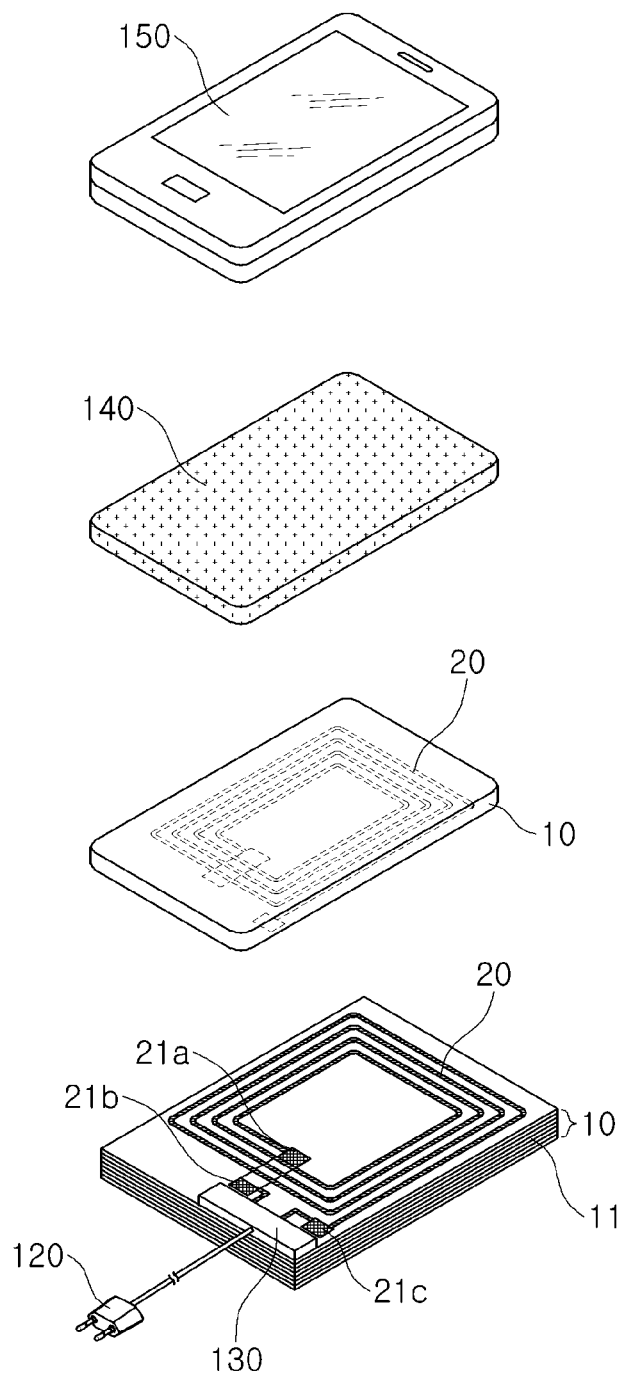
FIG. 6 is a schematic exploded perspective view of a contactless power transmission device including the shield part according to the present invention.

FIG. 6 is a schematic exploded perspective view of a contactless power transmission device including the shield part according to the present invention.

Referring to FIG. 6, the contactless power transmission device according to another embodiment of the present invention may include: a receiver; and a transmitter, wherein the transmitter includes a transmission shield part 110 and an external power supply part 120, and the receiver includes an electronic apparatus 150, a power storage part 140, and reception shield part 111, the transmission or reception shield part 110 or 111 including a magnetic laminate 10 formed by laminating a plurality of magnetic layers 11 and having a first surface and a second surface; a coil pattern 20 formed on the first surface; and a first lead part 21a formed at an end portion of a central portion of the coil pattern 20 and a second lead part 21b formed outside of the coil pattern 20, a recess 40 being formed by removing a portion of the second surface, the first lead part 21a being electrically connected to the second lead part 21b by a conductive material 50 disposed in the recess 40 and a first via 30a formed in the magnetic laminate 10 in a lamination direction, and the second lead part 21b being electrically connected to the first lead part 21a by the conductive material 50 disposed in the recess 40 and a second via 30b formed in the magnetic laminate 10 in the lamination direction.

The power storage part 140 may be a secondary battery, more specifically, a lithium ion secondary battery, but is not limited thereto.

Describing an operation principle of the contactless power transmission device, household alternate current (AC) power may be input from the external power supply part 120 of the contactless power transmitter.

After the input household AC power may be converted into direct current (DC) power by a power converting part 130, the converted DC power may be converted again into AC voltage having a specific frequency and then provided to a thin film coil.

When the AC voltage is applied to the coil pattern of the contactless power transmitter, a magnetic field around the coil pattern 20 may be changed.

As a magnetic field of the coil pattern 20 of the contactless power receiver disposed to be adjacent to the contactless power transmitter is changed, a coil part of the contactless power receiver outputs power to charge the power in the secondary battery 140.

The contactless power reception shield part 111 may prevent an inductive magnetic field generated in the coil pattern 20 from affecting the electronic apparatus 150.

In addition, the inductive magnetic field generated in the coil pattern 20 may generate eddy loss in the secondary battery 140, which reduces charging efficiency of the contactless power transmission device.

The magnetic laminate 10 may block the inductive magnetic field from affecting the secondary battery 140 to prevent the eddy loss from being generated, such that the charging efficiency of the contactless power transmission device may be increased.

In addition, the transmission shield part 110 may prevent the magnetic flux from being leaked in a direction opposite to a direction in which the contactless power receiver is positioned on the coil pattern 20, such that the charging efficiency of the contactless power transmission device may be increased.

The following Table 1 shows efficiency of the contactless power transmission device according to the thickness of the magnetic laminate 10 of the contactless power transmission device using the shield part of the present invention.

TABLE 1

| Thickness of magnetic laminate (um) | Efficiency in the absence of secondary battery | Efficiency in the presence of secondary battery |
| --- | --- | --- |
| 70 | 65.09 | 47.96 |
| 80 | 65.09 | 49.26 |
| 90 | 67.40 | 58.79 |
| 100 | 67.40 | 65.09 |
| 150 | 70.10 | 67.50 |
| 200 | 70.50 | 68.08 |

Charging efficiency indicates charging efficiency of the contactless power transmission device when efficiency at the time of performing the wire-charging is defined as 100%.

As shown in Table 1, in the vicinity of the secondary battery, eddy loss is generated, such that the efficiency of the contactless power transmission device may be deteriorated.

However, it may be confirmed that as the thickness of the magnetic laminate 10 increases, the efficiency of the contactless power transmission device 100 gradually increases.

That is, in the case in which the thickness of the magnetic laminate 10 is thinner than 100 um, the charging efficiency rapidly decreases to 60% or less.

As the thickness of the magnetic laminate 10 increases, the charging efficiency gradually increase, but in the case in which the thickness excessively increases, a commercialization property may de deteriorated, such that it may be difficult to apply the magnetic laminate to an electronic apparatus.

Further, in the case in which the thickness of the magnetic laminate 10 is thicker than 200 um, an amount of an increase in efficiency may be significantly small, as compared to amount of an increase in thickness.

That is, in order to obtain the maximum efficiency while maintaining the thickness to be low, the magnetic laminate 10 may have a thickness of 100 to 200 um.

Since the thickness of the coil pattern 20 is 5 to 95 um, a thickness of the shield part may be 105 to 295 um.

The contactless power transmission device and the method of fabricating the same according to the present invention described above are not limited to the abovementioned embodiments, but may be variously applied.

In addition, although the contactless power receiver used in the electronic apparatus has been described by way of example, the contactless power receiver according to the present invention is not limited thereto, but may be widely used in all electronic apparatuses capable of being used by charging power therein and all power transmission devices capable of transmitting the power.

As set forth above, in the shield part according to the present invention, the lead part electrically connecting the end portion of the central portion of the coil pattern and the outside to each other is formed integrally with the magnetic laminate, such that the thickness of the shield part including the coil pattern may be thinned.

In addition, the contactless power transmission device includes the shield part, such that the eddy loss may be decreased, thereby increasing the communications distance and efficiency.

While the present invention has been shown and described in connection with the embodiments, it will be apparent to those skilled in the art that modifications and variations can be made without departing from the spirit and scope of the invention as defined by the appended claims.

What is claimed is:

1. A shield part comprising:
a magnetic laminate formed by laminating a plurality of magnetic layers and having a first surface and a second surface;
a coil pattern formed on the first surface; and
a first lead part formed at an end portion of a central portion of the coil pattern and a second lead part formed outside of the coil pattern,
wherein a portion of the second surface is removed to form a recess, the first lead part is electrically connected to the second lead part by a conductive material disposed in the recess and a first via formed in the magnetic laminate in a lamination direction, and the second lead part is electrically connected to the first lead part by the conductive material disposed in the recess and a second via formed in the magnetic laminate in the lamination direction.

2. The shield part of claim 1, wherein the second lead part is connected to an external power supply.

3. The shield part of claim 1, wherein the conductive material further contains a magnetic material.

4. The shield part of claim 1, further comprising a magnetic layer formed on a lower portion of the magnetic laminate.

5. The shield part of claim 1, further comprising:
a conductive adhesive layer interposed between the first lead part and the first via; and
a conductive adhesive layer interposed between the second lead part and the second via.

6. A contactless power transmission device comprising:
a receiver; and
a transmitter,
wherein the transmitter includes a transmission shield part and an external power supply, and
the receiver includes an electronic device, a power storage part, and reception shield part,
the transmission or reception shield part including a magnetic laminate formed by laminating a plurality of magnetic layers and having a first surface and a second surface; a coil pattern formed on the first surface; and a first lead part formed at an end portion of a central portion of the coil pattern and a second lead part formed outside of the coil pattern,
a recess being formed by removing a portion of the second surface, the first lead part being electrically connected to the second lead part by a conductive material disposed in the recess and a first via formed in the magnetic laminate in a lamination direction, and the second lead part being electrically connected to the first lead part by the conductive material disposed in the recess and a second via formed in the magnetic laminate in the lamination direction.

7. The contactless power transmission device of claim 6, wherein the magnetic laminate has a thickness of 100 to 200 um.

8. The contactless power transmission device of claim 6, wherein the coil pattern has a thickness of 5 to 95 um.

9. The contactless power transmission device of claim 6, wherein the transmission or reception shield part has a thickness of 105 to 295 um.

* * * * *